US011386308B2

(12) United States Patent
Beveridge et al.

(10) Patent No.: US 11,386,308 B2
(45) Date of Patent: Jul. 12, 2022

(54) ARTEFACT CLASSIFICATION USING XENOSPACE CENTROIDS

(71) Applicant: Cylance Inc., Irvine, CA (US)

(72) Inventors: David N. Beveridge, Portland, OR (US); Hailey Buckingham, Vancouver, WA (US); Yaroslav Oliinyk, Portland, OR (US); Eric Petersen, Beaverton, CA (US)

(73) Assignee: Cylance Inc., San Ramon, CA (US)

( * ) Notice: Subject to any disclaimer, the term of this patent is extended or adjusted under 35 U.S.C. 154(b) by 210 days.

(21) Appl. No.: 16/219,616

(22) Filed: Dec. 13, 2018

(65) Prior Publication Data

US 2020/0193242 A1 Jun. 18, 2020

(51) Int. Cl.
*G06F 21/56* (2013.01)
*G06K 9/62* (2022.01)
*G06N 20/00* (2019.01)

(52) U.S. Cl.
CPC ........... *G06K 9/6272* (2013.01); *G06F 21/56* (2013.01); *G06N 20/00* (2019.01)

(58) Field of Classification Search
None
See application file for complete search history.

(56) References Cited

U.S. PATENT DOCUMENTS

| | | |
|---|---|---|
| 2013/0097706 A1 | 4/2013 | Titonis et al. |
| 2014/0130161 A1 | 5/2014 | Golovanov |
| 2018/0096230 A1* | 4/2018 | Luan .......................... G06T 7/60 |
| 2018/0144130 A1* | 5/2018 | Wolff .................... G06N 3/0454 |
| 2019/0362196 A1 | 11/2019 | Luan et al. |
| 2020/0026566 A1* | 1/2020 | Baggerman ............... G06F 9/50 |
| 2020/0120144 A1* | 4/2020 | Yadav ................... H04L 63/104 |
| 2020/0175321 A1* | 6/2020 | Panging ............... G06K 9/6223 |
| 2020/0302058 A1* | 9/2020 | Kenyon ................ G06F 21/554 |

FOREIGN PATENT DOCUMENTS

WO 2020123979 A1 6/2020

OTHER PUBLICATIONS

Patent Cooperation Treaty, International Search Report for International Application No. PCT/US2019/066286 dated May 13, 2020 (4 pages).
Patent Cooperation Treaty, Written Opinion for International Application No. PCT/US2019/066286 dated May 13, 2020 (10 pages).

* cited by examiner

*Primary Examiner* — Dawaune A Conyers
(74) *Attorney, Agent, or Firm* — Jones Day

(57) ABSTRACT

An artefact is received and parsed into a plurality of observations. A first subset of the observations are inputted into a machine learning model trained using historical data to classify the artefact. In addition, a second subset of the observations are inputted into a xenospace centroid configured to classify the artefact. Thereafter, the artefact is classified based on a combination of an output of the machine learning model and an output of xenospace centroid. Related apparatus, systems, techniques and articles are also described.

20 Claims, 3 Drawing Sheets

ARTEFACT CLASSIFICATION USING XENOSPACE CENTROIDS

TECHNICAL FIELD

The subject matter described herein relates to the use of xenospace centroids for classification of artefacts.

BACKGROUND

Machine learning is becoming increasingly adopted across many industries in an effort to automatically classify data. While machine learning has been demonstrated to be clearly effective, it faces challenges when new information comes to light. For example, such information requires the utilized models to be retrained based on such new information (or alternatively new models need to be created). Even with systems incorporating automated or semi-automated machine learning, the processes for training a model are computationally expensive. Not only do the underlying mathematical models need to be updated, but other modules such as observers and vectorizers need to be updated, distributed, and deployed.

SUMMARY

In a first aspect, an artefact is received and parsed into a plurality of observations. A first subset of the observations are inputted into a machine learning model trained using historical data to classify the artefact. In addition, a second subset of the observations are inputted into a xenospace centroid configured to classify the artefact. Thereafter, the artefact is classified based on a combination of an output of the machine learning model and an output of xenospace centroid.

The classification can, in some cases, relate to whether the artefact is malicious or benign (i.e., safe to access, execute, etc.). If the artefact is deemed to be malicious, execution/continued execution of the artefact can be prevented as can access to such artefact.

The artefact can take various forms including, for example, a file, a portion of a file, metadata characterizing a file, and/or source code (i.e., executable code, etc.).

In some variations, all of the observations in the first subset of the observations can differ from all of the observations in the second subset of the observations. In other variations, a portion of the observations in the first subset of the observations can be common to a portion of the observations in the second subset of the observations. In yet other variations, the first subset of the observations can be common to all of the observations in the second subset of the observations.

The machine learning model can take various forms, including without limitation, at least one a logistic regression model, a neural network, a concurrent neural network, a recurrent neural network, a generative adversarial network, a support vector machine, or a random forest.

In some cases, the output of the xenospace centroid can modify a classification workflow for the artefact and that such modified classification workflow can be used to ultimately classify such artefact. An example of a modified classification workflow can include providing the second subset of observations to a remote computing system for analysis and receiving a classification from the remote computing system. With such an arrangement, the output of the xenospace centroid can be used to classify the artefact as malicious is or is based on the classification received from the remote computing system.

The output of the xenospace centroid can be logged for informational purposes along with an identification of the artefact.

In an interrelated aspect, an artefact is received and is parsed into a plurality of observations. A first subset of the observations are input into a machine learning model trained using historical data to classify the artefact as being malicious or benign. Further, a second subset of the observations are input into a xenospace centroid configured to classify the artefact as being malicious, benign, or requiring cloud processing. The second subset of observations is provided to a remote computing system for analysis if an output of the xenospace is requires cloud processing and, subsequently, a classification is received from the remote computing system. The artefact can be characterized malicious or benign based on a combination of (i) an output of the machine learning model and (ii) an output of xenospace centroid and/or the received classification from the remote computing system. Further, the artefact can be prevent from being executed, from continuing to execute, or from being accessed if the classification of the artefact is malicious.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can be quickly deployed and/or modified in order to provide more robust malware classification whether as a standalone solution or when used in combination with a machine learning-based malware classification system.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to the classification of artefacts (e.g., classifying the artefact as being malicious or benign, etc.) using a xenospace centroid (either as a standalone solution or in combination with a different solution utilizing, for example, a machine learning model). Such classifications can be used for a variety of purposes including quarantining an artefact, ceasing to execute an application utilizing an artefact (sometimes referred to as execution control), preventing an application for accessing or otherwise using an artefact, subjecting such artefact to further processing (whether locally or remote), and the like.

Figure 1:
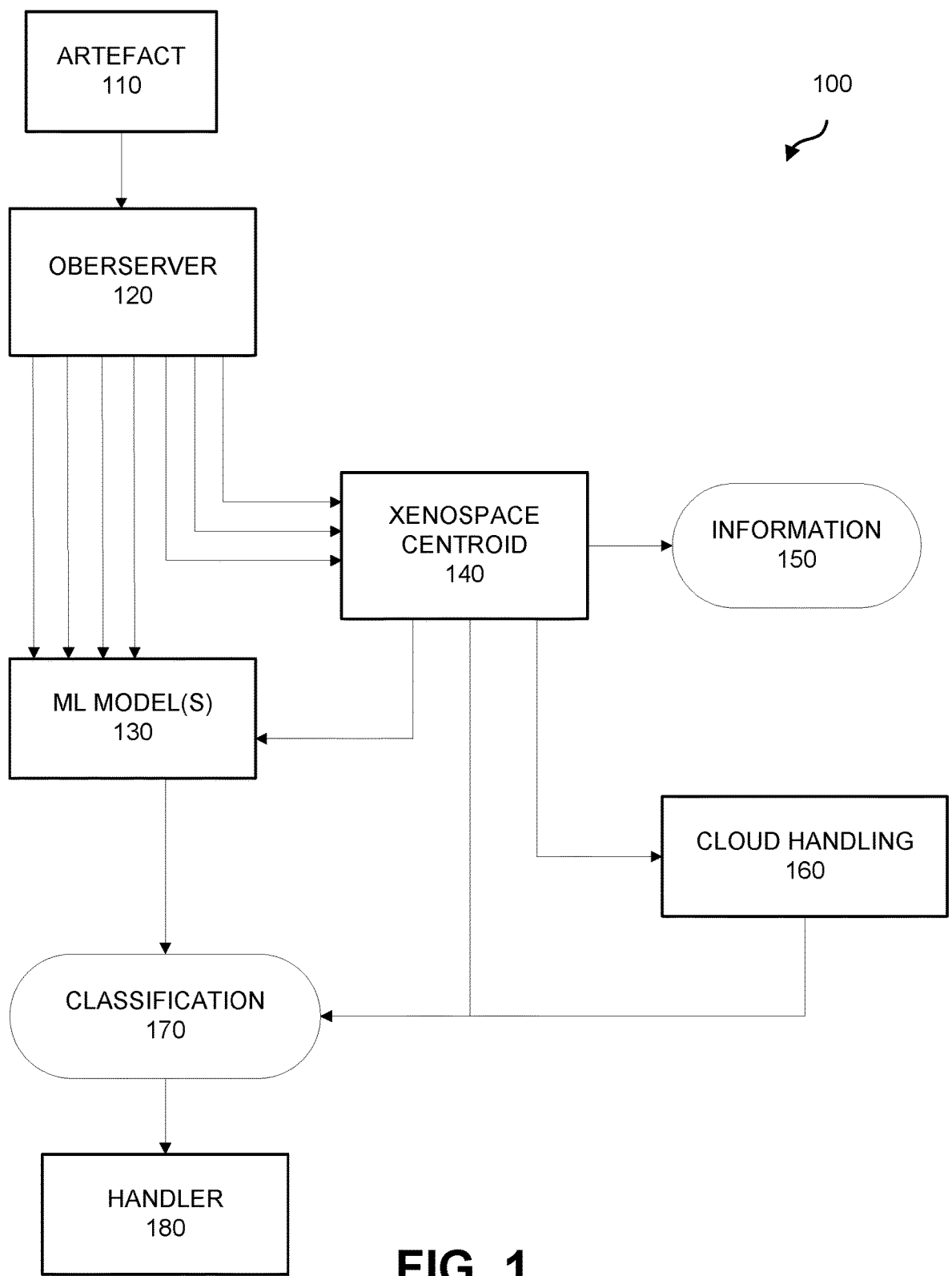
FIG. 1 is a system diagram illustrating an architecture for characterizing artefacts using machine learning models and xenospace centroids.

FIG. 1 is a system diagram 100 illustrating a hybrid malware classification system that utilizes both a machine learning model 130 and a xenospace centroid 140. Initially, an artefact 110 can be received (e.g., accessed, loaded, received from a remote computing system, etc.). The artefact 110 can be a file, a portion of a file, metadata characterizing a file, and/or source code. This artefact 110 can be parsed or otherwise processed by an observer 120. In particular, the observer 120 can extract observations (sometimes referred to as attributes or features) from the artefact and vectorize such observations. These observers 120 can be configured such that it can be easily modified after deployment to extract additional types of observations.

An observation by the observer 120 can be anything computer code can generate when examining an artefact, including operating programs within that artefact. Observations can include, for example, Boolean flags (fileUsesCrypto=true), continuous values (someOptionalFieldLength=0), existence values (someOptionalFieldLengthIsPresent=true), categorical values (cryptoSignType=RSA_SHA256), map values (frequencyMap={'a'=0.1, 'b'=0.02, 'c'=0.34}), array values (opCodes=[0xDE, 0xAD, 0xBE, 0xEF]). Arrays can have order relevant (instructionSequence=["turnoff", "turnon", "test"]) or order-irrelevant ("thingsIFoundInMyPocket"= ["lint", "string", "oneTrueRing"]. Any sets of these observations can contain other observations in a hierarchy (i.e., observations can be nested in nature, etc.).

The observer 120 can extract observations in a variety of manners. For example, the observer 120 can examine/extract direct (almost external) views of an artefact (e.g., the artefact is a Windows Executable, this artefact is $x bytes long, etc.). The observations can include filetype observations (e.g., the artefact has a mach-o header that declares a value of $y for architecture which means ARM7/64). These observations can include meta-type observations (e.g., the artefact declared a set of relocation offsets, one of which has a value that when analyzed would reside outside of the file's memory image; observation of "suspicious relocation offset=true"). The observations can include statistical methods (e.g., compute statistical randomness for every $z sized contiguous block of thing, output an observation of an array of these values, in order, etc.). The observer 120 can provide the machine learning model 130 with a subset of the overall observations to use for classification (which can be, for example, in the form of a vector as part of a pre-defined feature vector map). The machine learning model 130 can include a single model or an ensemble of models (that execute in parallel, in cascading format, or a combination thereof). The machine learning model 130 can be one or more of a logistic regression model, a neural network (including concurrent neural networks, recurrent neural networks, generative adversarial networks, etc.), a support vector machine, a random forest, and the like. The machine learning model 130 can be trained using historical artefact information with known classifications. The output of the machine learning model 130 can be a classification 170 of the particular artefact 110 or, in some cases in which there are a group of artefacts 110, a classification of such group (e.g., all artefacts 110 within a container file can be deemed malicious As noted above, updating the machine learning model 130 once trained and deployed can be costly in terms of computing resources, and the like. As such, the observations used by the machine learning model 130 can be static. In contrast, the observations used by the xenospace centroid 140 can vary (i.e., the xenospace centroid allows for extensibility of the malware classification system as a whole). In some variations, an output of the xenospace centroid 140 can be fed back to or otherwise used by the machine learning model 130. Stated differently, the xenospace centroid 140 can provide one or observations for use by the machine learning model 130. For example, the xenospace centroid 140 can provide an observation to the machine learning model 130 indicating that the artefact 110 does not match any of the spaces defined therein. In some cases, the xenospace centroid 140 can include a multiplicity of individual centroids.

The xenospace centroid 140 can be a space (e.g., geometric or otherwise) in which artefacts 110 are classified. The xenospace centroid 140 can comprise a list of observations to analyze with an expected value for each observation, a mean and variance curve for each observation (to relate expected value to found value), and a weight for each (so all observations are not treated equally), The xenospace centroid 140 can also specify a faux-'radius' that indicates at what point a match occurs and an 'action' for matching (malware, benign, or routing/informational). Such classification can be, for example, malicious, benign, clean, and/or the like. Alternatively, the classification can be provided for informational purposes and the like. The classification can, for example, comprise a score or series of scores (which in turn can be used for classification). Although the xenospace centroid 140 is generally described as being used for the classification of malicious files, such xenospace centroid 140 as provided herein can be used for or with other file classification schemes (i.e., to provide extensibility to an existing model such as a machine learning model). Furthermore, the xenospace centroid 140 can be used as part of an ensemble of multiple different types of models (some or all of which may be centroid-based models) that in parallel and/or in serial fashion analyze a particular artefact 110 or portion thereof. In some cases, there can be cascading models in which the xenospace centroid 140 can be used to route files/samples to other specific models (as opposed to a binary determination of some sort). Further, the xenospace centroid 140 may have various attributes and be used in an environment similar to the centroids described in U.S. Pat. App. Ser. No. entitled "Centroid for Improving Machine Learning Classification and Info Retrieval", the contents of which are hereby fully incorporated by reference.

The xenospace centroid 140 can be configured to provide various types of outputs. With the xenospace centroid 140, each Observation can be considered data input into a "rule". There can be multiple rules to create rudimentary logic; and the observer 120 which produces the observation can have code added to integrate any level of complexity (logic) into an observation utilized by the xenospace centroid 140. Thus, an output of "match v. not match" can contain many layers of logic to narrowly define what it means to match. For example, a no match output can be routed to the machine learning model 140. This output refers to there being no relevant centroids for that particular observation. Another type of output is simply an indicator which is for information only 150. Stated differently, relevant information about the artefact 110 such as can be provided for informational purposes. For example, such information can include whether the artefact looks like dnsapi, the artefact is not signed, the artefact has embedded URI, and the artefact has embedded URI that is an IP Address]==XSC.possibleDN-SAPIHack. As further examples, such information can include whether the artefact is a Windows executable, the artefact has a non-standard pattern of randomness after $1^{st}$ KiB from start, and the artefact has relocations outside of file-image, file is not signed]=XSC.looksPacked.

In some cases, an output of the xenospace centroid 140 can be routed to a different workflow such as one including a cloud handling module 160. In this case, the observations utilized by the xenospace centroid 140 and/or by the machine learning model 130 can be routed to be processed remotely (i.e., in the cloud). For example, more computationally expensive malware classification models (whether machine learning-based or otherwise) can be executed by the cloud handling module 160 and a classification 170 can be provided. Further, in some variations, the xenospace centroid 140 can indicate that the artefact 110 is packed or is otherwise obfuscating its contents so that such artefact 110 can be provided to the cloud handling module 160 for unpacking, parsing, and scoring (which can result in a different classification 170 than if determined by the machine learning model 130).

A handler 180 can take some action using the classification 170 (whether it derives from the machine learning model 130, the xenospace centroid 140, the cloud handling module 160 or a combination thereof). For example, the handler 180 can cause the artefact 110 to be deleted or quarantined. In addition, or in the alternative, the handler 180 can prevent execution or continued execution of the artefact 110 and/or processes utilizing same (i.e., the handler 180 can exercise execution control in relation to the artefact 110).

In some variations, the machine learning model 130 can be bypassed altogether based on an output of the xenospace centroid 140. Conversely, in other variations, the xenospace centroid 140 can be bypassed altogether based on the output of the machine learning model 130.

Figure 2:
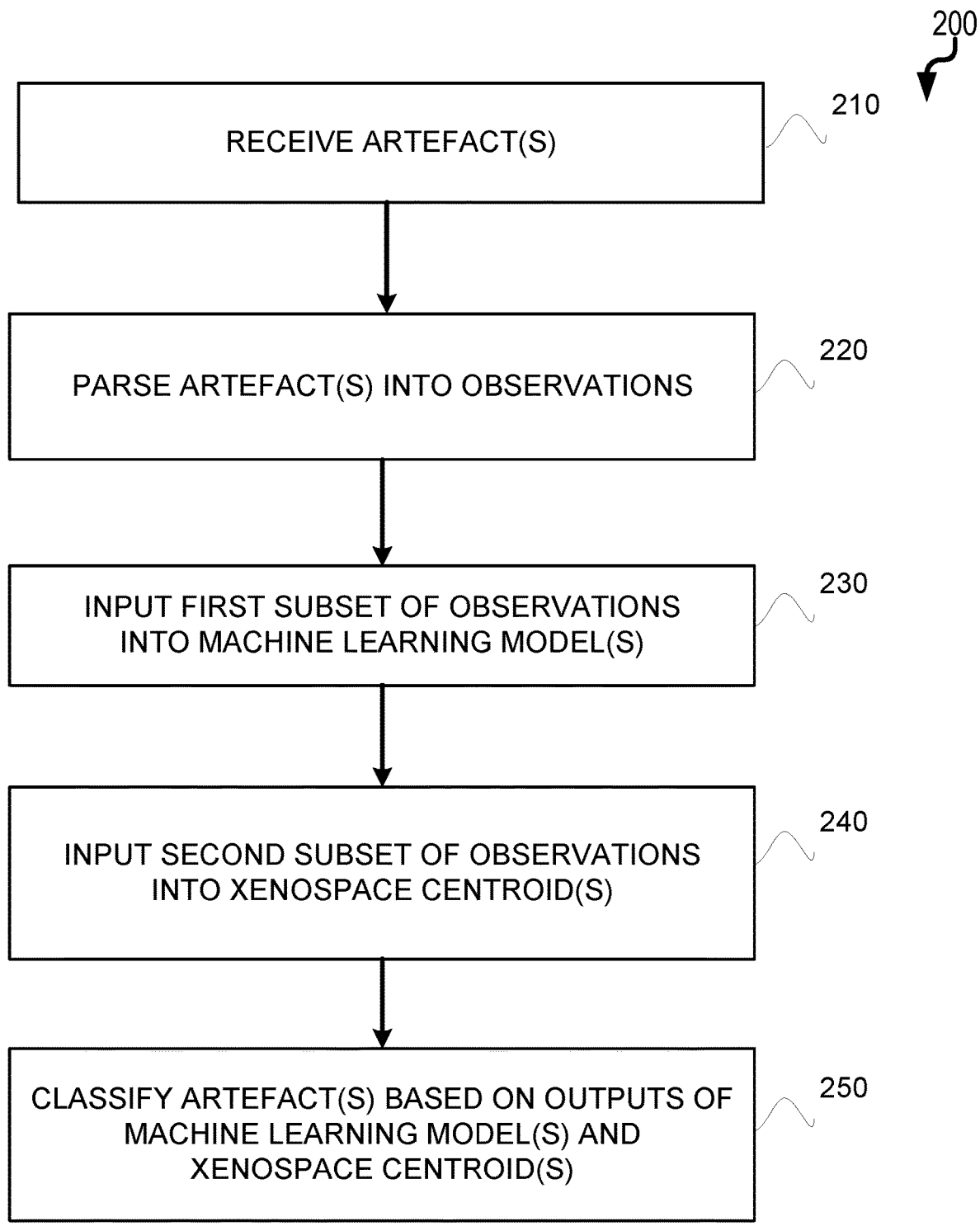
FIG. 2 is a process flow diagram for characterizing artefacts using machine learning models and xenospace centroids.

FIG. 2 is a process flow diagram 200 in which, at 210, an artefact is received. Thereafter, at 220, the artefact is parsed into a plurality of observations. A first subset of the observations is inputted, at 230, into a machine learning model trained using historical data to classify the artefact as being malicious. In addition, at 240, a second subset of the observations are inputted into a xenospace centroid configured to classify the artefact (e.g., classify the artefact as being malicious or benign, etc.). The analysis by the machine learning model and the xenospace centroid can occur in parallel or in sequence depending on the desired configuration. Subsequently, at 250, the artefact is classified (e.g., classified as malicious or benign, etc.) based on a combination of an output of the machine learning model and an output of xenospace centroid.

Figure 3:
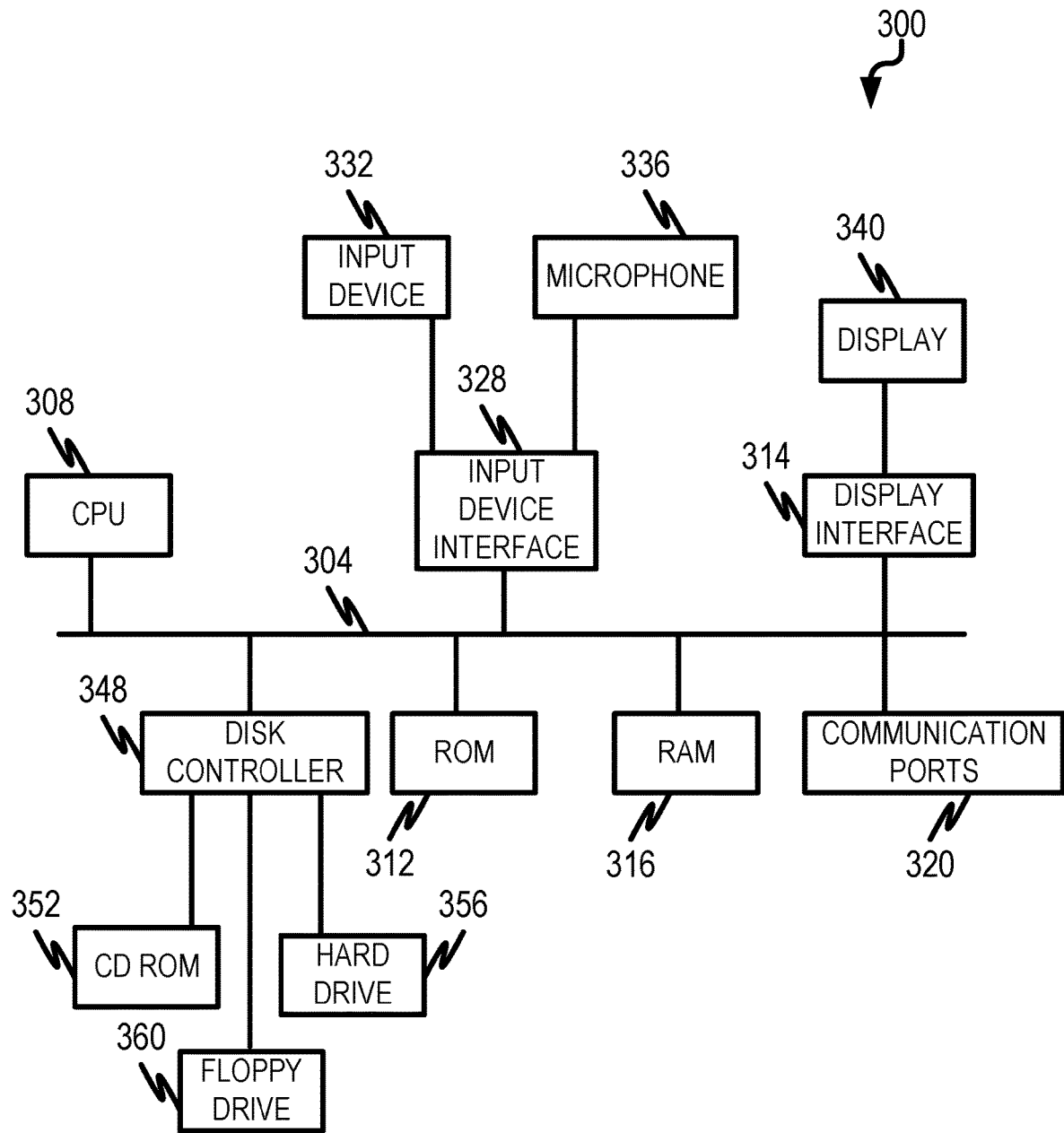
FIG. 3 is a diagram illustrating a computing device for implementing aspects of the subject matter described herein.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving an artefact;
parsing the artefact into a plurality of observations;
inputting a first subset of the observations into a machine learning model trained using historical data to classify the artefact;
inputting a second subset of the observations into a xenospace centroid configured to indicate whether cloud processing is needed to classify the artefact, the second subset of the observations being at least partially different than the first subset of the observations;
providing the second subset of observations to a remote computing system for analysis when an output of the xenospace centroid generated in response to inputting the second subset of observations indicates that the artefact requires cloud processing and receiving a classification from the remote computing system;
classifying the artefact as malicious or benign based on a combination of (i) an output of the machine learning model generated in response to inputting the first subset of observations and (ii) the received classification from the remote computing system when the output of the xenospace centroid indicates that the artefact requires cloud processing; classifying the artefact as malicious or benign based solely on the output of the machine learning model when the xenospace centroid indicates that the artefact does not need cloud processing; and
preventing the artefact from being executed, from continuing to execute, and from being accessed when the artefact is classified as malicious.

2. The method of claim 1, wherein the artefact comprises at least one of: a file, a portion of a file, metadata characterizing a file, or source code.

3. The method of claim 1, wherein all of the observations in the first subset of the observations differ from all of the observations in the second subset of the observations.

4. The method of claim 1, wherein a portion of the observations in the first subset of the observations are common to a portion of the observations in the second subset of the observations.

5. The method of claim 1, wherein the machine learning model comprises at least one of: a logistic regression model, a neural network, a concurrent neural network, a recurrent neural network, a generative adversarial network, a support vector machine, or a random forest.

6. The method of claim 1 further comprising: logging the output of the xenospace centroid for informational purposes along with an identification of the artefact.

7. The method of claim 1, wherein at least a portion of the plurality of observations are hierarchical.

8. The method of claim 1, wherein the observations comprise one or more of: Boolean flags, continuous values, existence values, categorical values, map values, or array values.

9. A system comprising:
at least one data processor; and
memory storing instructions which, when executed by the at least one data processor, result in operations comprising:
receiving an artefact;
parsing the artefact into a plurality of observations;
inputting a first subset of the observations into a machine learning model trained using historical data to classify the artefact;
inputting a second subset of the observations into a xenospace centroid configured to indicate whether cloud processing is needed to classify the artefact, the second subset of the observations being at least partially different than the first subset of the observations;
providing the second subset of observations to a remote computing system for analysis when an output of the xenospace centroid generated in response to inputting the second subset of observations indicates that the artefact requires cloud processing and receiving a classification from the remote computing system;
classifying the artefact as malicious or benign based on a combination of (i) an output of the machine learning model generated in response to inputting the first subset of observations and (ii) the received classification from the remote computing system when the output of the xenospace centroid indicates that the artefact requires cloud processing;
classifying the artefact as malicious or benign based solely on the output of the machine learning model when the xenospace centroid indicates that the artefact does not need cloud processing; and
preventing the artefact from being executed, from continuing to execute, and from being accessed when the artefact is classified as malicious.

10. The system of claim 9, wherein the artefact comprises at least one of: a file, a portion of a file, metadata characterizing a file, or source code.

11. The system of claim 9, wherein the machine learning model comprises at least one of: a logistic regression model, a neural network, a concurrent neural network, a recurrent neural network, a generative adversarial network, a support vector machine, or a random forest.

12. The system of claim 9, wherein all of the observations in the first subset of the observations differ from all of the observations in the second subset of the observations.

13. The system of claim 9, wherein a portion of the observations in the first subset of the observations are common to a portion of the observations in the second subset of the observations.

14. The system of claim 9, wherein the operations further comprise: logging the output of the xenospace centroid for informational purposes along with an identification of the artefact.

15. A computer-implemented method comprising:
receiving an artefact;
parsing the artefact into a plurality of observations;
inputting a first subset of the observations into a machine learning model trained using historical data to classify the artefact as being malicious or benign;
inputting a second subset of the observations into a xenospace centroid configured to indicate whether the artefact requires cloud processing;
providing the second subset of observations to a remote computing system for analysis when an output of the xenospace centroid generated in response to inputting the second subset of observations indicates that the artefact requires cloud processing and receiving a classification from the remote computing system;
classifying the artefact as malicious or benign based on a combination of (i) an output of the machine learning model generated in response to inputting the first subset of observations and (ii) the received classification from the remote computing system when the output of the xenospace centroid indicates that the artefact requires cloud processing; classifying the artefact as malicious or benign based solely on the output of the machine learning model when the xenospace centroid indicates that the artefact does not need cloud processing; and
preventing the artefact from being executed, from continuing to execute, and from being accessed when the artefact is classified as malicious.

16. The method of claim 15, wherein the machine learning model comprises at least one of: a logistic regression model, a neural network, a concurrent neural network, a recurrent neural network, a generative adversarial network, a support vector machine, or a random forest.

17. The method of claim 15, wherein the artefact comprises at least one of: a file, a portion of a file, metadata characterizing a file, or source code.

18. The method of claim 15, wherein all of the observations in the first subset of the observations differ from all of the observations in the second subset of the observations.

19. The method of claim 15, wherein a portion of the observations in the first subset of the observations are common to a portion of the observations in the second subset of the observations.

20. The method of claim 15 further comprising: logging the output of the xenospace centroid for informational purposes along with an identification of the artefact.

* * * * *